(12) United States Patent
Akiba

(10) Patent No.: US 6,336,683 B1
(45) Date of Patent: Jan. 8, 2002

(54) FIXED PLATFORM SELF-PROPELLED TRAILER DUMP

(75) Inventor: Youichiro Akiba, Chiba (JP)

(73) Assignee: Various, Inc., Tokyo (JP)

( * ) Notice: Subject to any disclaimer, the term of this patent is extended or adjusted under 35 U.S.C. 154(b) by 0 days.

(21) Appl. No.: 09/456,417

(22) Filed: Dec. 8, 1999

(51) Int. Cl.$^7$ .............................................. B65G 67/02
(52) U.S. Cl. ...................... 298/8 T; 298/8 R; 280/508; 213/172
(58) Field of Search ...................... 298/8 R, 8 T, 22 R, 298/17 T; 280/508; 213/172, 173

(56) References Cited

U.S. PATENT DOCUMENTS

| | | | | |
|---|---|---|---|---|
| 1,448,950 A | * | 3/1923 | Uecker ........................ | 280/508 |
| 1,749,274 A | * | 3/1930 | Crisler ........................ | 298/8 T |
| 2,120,415 A | * | 6/1938 | Meyer ........................ | 280/508 |
| 3,103,288 A | * | 9/1963 | Pruss ........................ | 298/8 T |
| 3,120,408 A | * | 2/1964 | Pruss ........................ | 298/8 R |
| 3,193,330 A | * | 7/1965 | Hribar, Jr. .................. | 298/8 R |
| 4,674,942 A | * | 6/1987 | Assh et al. .................. | 298/8 T |
| 5,261,687 A | * | 11/1993 | Bergman ................. | 280/508 X |
| 6,047,982 A | * | 4/2000 | McClure et al. ........ | 280/508 X |

FOREIGN PATENT DOCUMENTS

| CA | 964689 | * | 3/1975 | .................. 298/8 T |
|---|---|---|---|---|

* cited by examiner

Primary Examiner—Stephen T. Gordon
(74) Attorney, Agent, or Firm—Carter, Ledyard & Milburn

(57) ABSTRACT

The present invention provides a self-propelled trailer dump truck which can convey earth and sand at an amount substantially corresponding to two dump trucks by one conveying operation without overloading, whereby excellent effects can be obtained on an economical field and an environmental field. The fixed platform self-propelled trailer TR is provided with a power engine 9 for self-propelling, a mechanism such as a steering system and the like, a dumping mechanism OS for taking off a load and a load box 6 connected to said dumping mechanism OS, wherein an open driver's seat 8 is positioned in front of said load box 6, a trailing member 12 provided in a front end side of a chassis 7 is provided so as to freely rise and fall, and the trailing member 12 is stood up at a time of self-propelling.

3 Claims, 4 Drawing Sheets

FIXED PLATFORM SELF-PROPELLED TRAILER DUMP

BACKGROUND OF THE INVENTION

1. Field of the Invention

The present invention relates to a trailer structured such as to have a self-propelling performance and a dumping performance, and a self-propelled trailer dump which pulls the trailer on a general public road and self-propels and performs a dumping operation on a place such as a fixed platform, a working place and the like except the public road.

2. Description of the Related Art

A dump truck is widely employed in various fields as means for conveying a construction work materials such as earth and sand in various kinds of engineering works and the like, however, since there is a case that the earth and sand at an amount over an allowable loading weight are conveyed, not only roads, bridges and the like are injured, but also problems on safety is pointed out, so that an overloading is strictly restricted in the existing circumstances.

However, for example, when the dump truck conveys at a suitable loading amount in mining the earth and sand, a loading amount at one conveyance is reduced at that degree, so that an efficiency of conveyance is reduced. Particularly, since it is required to increase a number of conveyance with respect to the earth and sand which can not be overloaded, or increase a working number of the dump trucks for conveying, this generates a problem that a negative effect is given to an economic field. Further, the more the number of the working dump trucks becomes, not only the more a cost for a fuel and a fee for traveling are required but also the more the dump trucks and the operators required therefor are required, so that it is uneconomical and increases a disadvantage on an environmental field.

SUMMARY OF THE INVENTION

The present invention is made by taking the problem mentioned above into consideration, and an object of the present invention is to provide a self-propelled trailer dump truck which can convey earth and sand at an amount substantially corresponding to two dump trucks by one conveying operation without overloading, whereby excellent effects can be obtained on an economical field and an environmental field.

A structure of the self-propelled trailer dump according to the present invention which is made for the purpose of achieving the object is characterized in that a trailer provided with a power engine for self-propelling, mechanisms of a steering system and the like, a dumping mechanism for taking off a load and a loading box is detachably trailed and connected to a dump truck.

The power engine and the mechanism of an operation system and the steering system which are provided for the purpose that the trailer self-propels are provided in a front portion or a rear portion of the trailer. Further, a brake system for the trailer and a safety light system are structured such as to interlock with a system in the dump truck side at a time of trailing and on the other hand, to be driven by operating the mechanisms of the operation system and the steering system in the trailer at a time of self-propelling.

DESCRIPTION OF THE PREFERRED EMBODIMENTS

Figure 1:
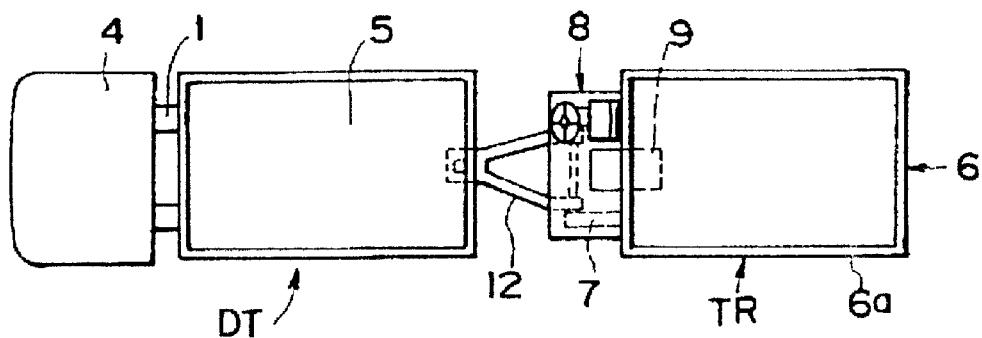
FIG. 1 is a plan view of an embodiment of a dump truck according to the present invention.
Figure 3:
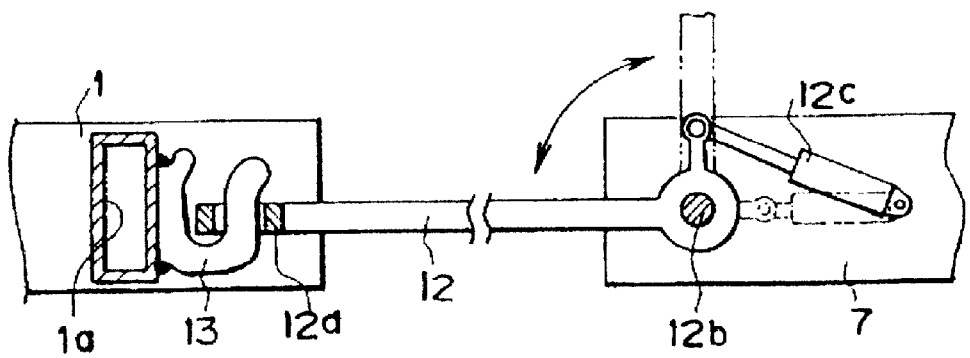
FIG. 3 is an enlarged side elevational view which shows a main portion of an embodiment of a trailing mechanism.
Figure 4:
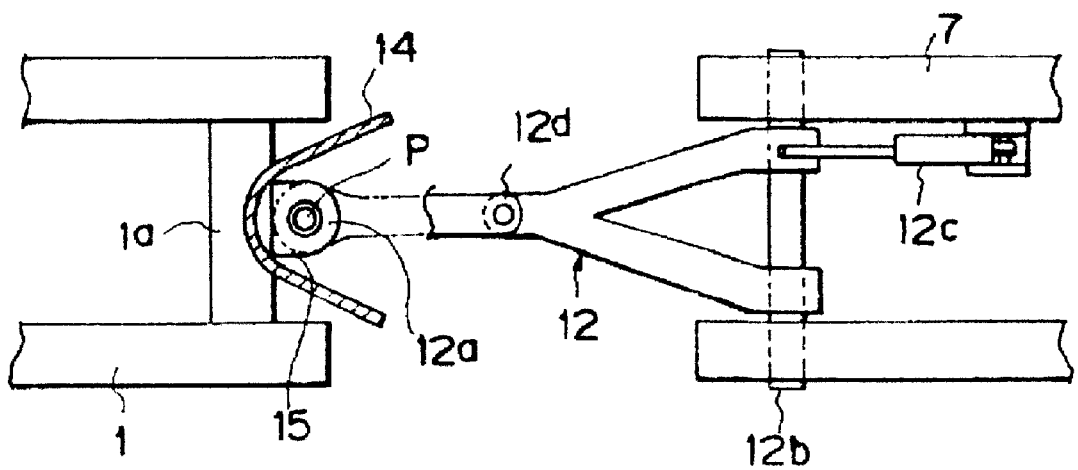
FIG. 4 is an enlarged cross sectional view which shows a main portion of another embodiment of the trailing mechanism.
Figure 5:
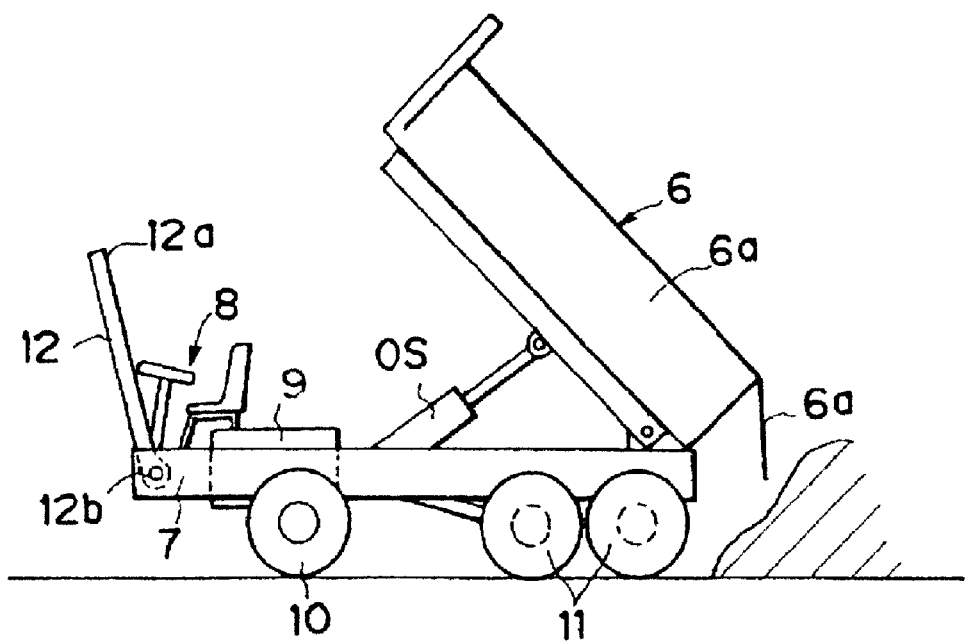
FIG. 5 is a cross sectional view which shows an operating state of the trailer in the trailer dump according to the present invention.
Figure 6:
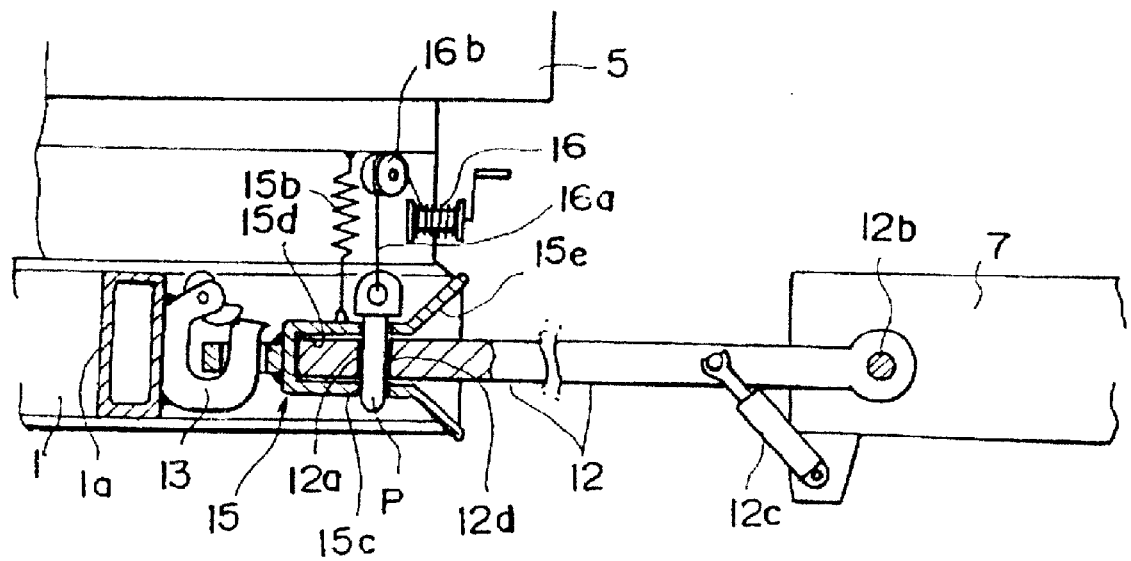
FIG. 6 is a side elevational view of the other embodiment of the trailing mechanism.
Figure 7:
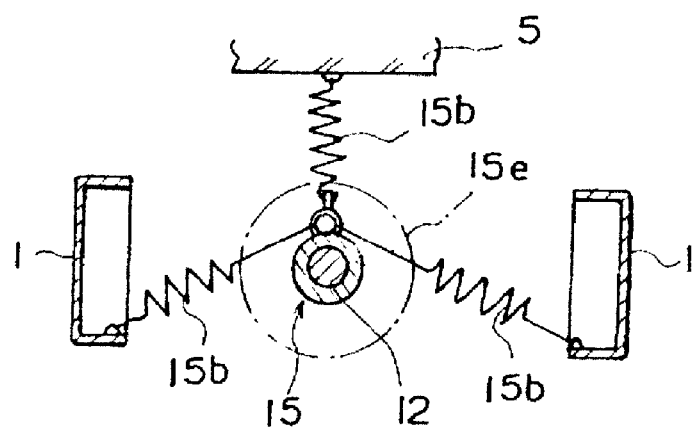
FIG. 7 is a side elevational view of a main portion of the mechanism in FIG. 6 as seen from a right side.
Figure 8:
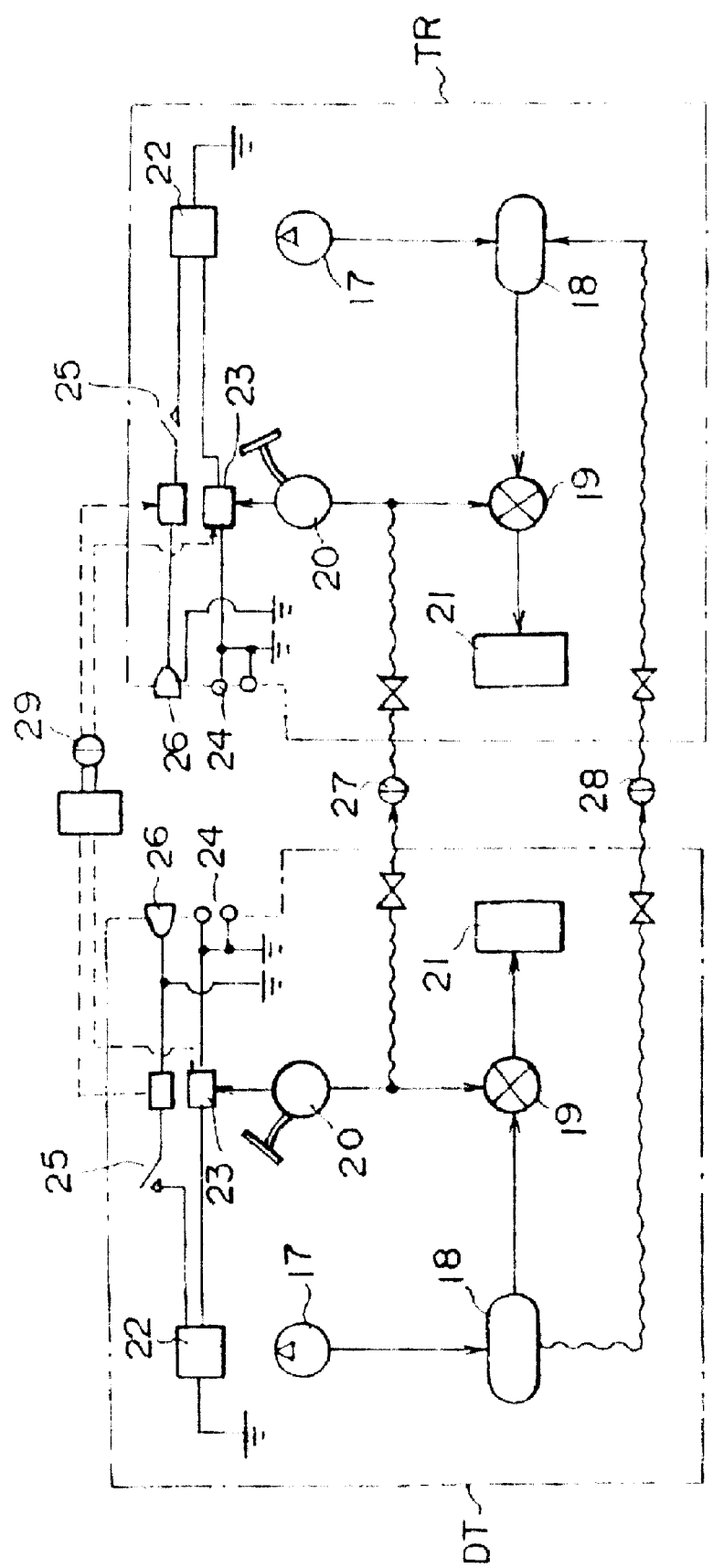
FIG. 8 is a circuit block diagram which shows a structure of a brake system and an electric system for the dump truck and the trailer and an example of a connecting state.

Next, embodiments of a dump truck according to the present invention having the structure mentioned above will be described with reference to the accompanying drawings. FIG. 1 is a plan view of an embodiment of a dump truck according to the present invention, FIG. 2 is a side elevational view of the dump truck in FIG. 1, FIG. 3 is an enlarged side elevational view of an embodiment of a trailing mechanism, FIG. 4 is an enlarged cross sectional view of another embodiment of the trailing portion, FIG. 5 is a side elevational view of an operating state of the self-propelled trailer, FIG. 6 is a side elevational view of another embodiment of the trailing mechanism, FIG. 7 is a side elevational view of a main portion of the mechanism in FIG. 6 as seen from a right side and FIG. 8 is a circuit block diagram which shows a structure of a brake system and an electric system for the dump truck and the trailer and an example of a connecting state.

Figure 2:
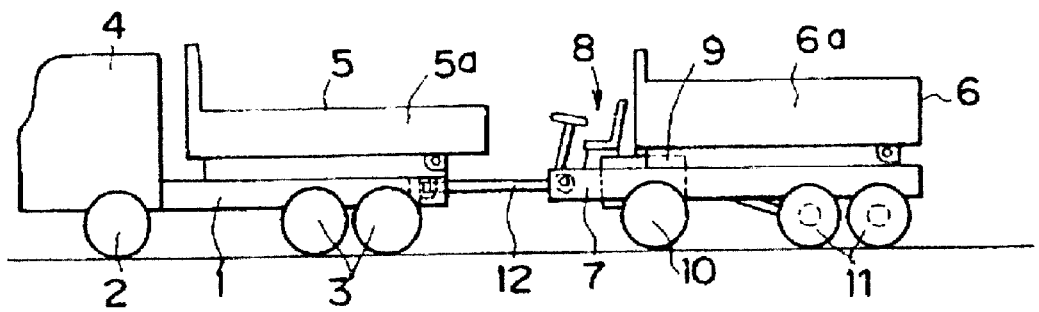
FIG. 2 is a side elevational view of the dump truck in FIG. 1.

In FIGS. 1 and 2, reference symbol DT denotes a dump truck which is provided with the same mechanism as that of a known dump truck, which is structured such that a power engine (not shown) such as an engine, front and rear wheels 2 and 3, a driver's seat cabin 4 provided with an operation system and a steering system and a load box 5 are mounted to a chassis 1. Further, the structure is made in the same manner as that of the known dump truck in view that a front portion of the load box 5 is freely ascended and descended around a rear portion of the load box 5 by means of an elevator mechanism such as an oil hydraulic cylinder (not shown).

Since a capacity of the load box 5 is set so as to correspond to a maximum loading amount which is allowed for the dump truck DT, and it is not allowed to increase the loading amount by rising a gate panel 5a, a height of the gate panel 5a is low. The illustrated dump truck DT is structured such that a total length is substantially 8 m in the case of 10 ton loading truck, however, the total length is varied in correspondence to the loading amount.

Since the present invention is structured such that a trailer TR having a self-propelling function capable of being steered and a dumping function for the load box is connected to the known dump truck DT mentioned above in a freely trailing manner, this point will be described below.

In this case, the trailer TR is structured such as to set a total length of a load box 6 to substantially 5 m, be mounted on a chassis 7 via a dumping mechanism (not shown) mainly having an oil hydraulic lower cylinder and have a gate plate 6a formed a little deeper (higher) so that a loading amount becomes about 6 tons to 10 tons. A total width of the load box 6 is the same as that of the load box 5 in the truck side. An open driver's seat 8 provided with an operation system such as pedals for a handle, a brake, a clutch and an accelerator and a steering system is provided in a front portion of the chassis 7, and a power engine 9 comprising an engine and the like is arranged beside the seat. Reference numerals 10 and 11 denote a wheel for the trailer arranged in front of and at the back of the chassis 7, in which the front wheels 10 correspond to steered wheels and the rear wheels 11 correspond to drive wheels.

A dumping mechanism mainly constructed by an oil hydraulic cylinder OS for ascending and descending the front side of the load box around the rear portion of the chassis 7 is provided in the load box 6 of the trailer TR, and an operation portion (not shown) for the dumping mechanism is also attached to the driver's seat 8.

The trailer TR is, as exemplified in FIG. 3, a trailing member 12 formed by a bar-like member at a center of the front end portion of the chassis 7 in such a manner as to protrude forward, and a front end portion 12a of the trailing member 12 is formed so as to be detachably connected to a piston hook 13 later attached to a cross beam la at the rear end portion of the chassis 1 in the dump truck DT.

For example, the trailing member 12 provided in the trailer TR is mounted to the front end portion of the chassis 7 via a horizontal shaft 12b and an oil hydraulic cylinder 12c so that a base portion thereof (a side to be mounted to the chassis 7) can rise and fall around the shaft 12b with respect to the chassis 7. In this case, an arranging aspect of the cylinder 12c for rising and falling the trailing member 12 is not limited to the aspect shown in FIG. 3. The structure is made such that the front end portion 12a can be connected to/disconnected from the piston hook 13 by an operation in the driver's seat 8 due to the rising and falling function of the trailing member 12 and the trailing member 12 is stood up at a time of self-propelling so as not to prevent traveling (refer to FIG. 5).

A length of the trailing member 12 mentioned above is optionally selected, however, in the case of the 10 ton loading according to the embodiment mentioned above, an effective length of the trailing member 12 is set such that a distance about 1 to 1.5 m can be secured between the rear end surface of the load box 5 of the dump truck DT and the front surface of the chassis 7 in the trailer TR. Accordingly, a total length of the trailer dump according to the present invention becomes, for example, about 14 to 14.5 m, however, the total length can be freely set in correspondence to a length of the chassis 7 in the trailer TR side and a length of the load box 6.

In the present invention, the trailing portion can be structured as shown in FIG. 4 which is a plan view showing a summary of the trailing portion. That is, in FIG. 4, the structure can be made such that a pin receiving member 20 provided with a guide member 14 formed in a trumpet shape in a horizontal cross section is provided in the cross-beam 1a attached to the rear portion of the chassis 1 of the dump truck DT, and a pin P is inserted into a hole on the front end portion 12a of the trailing member 12 and a hole on the pin receiving member 20, thereby connecting the trailer TR. In the case of the embodiment shown in FIG. 4, it is desirable that the trailing member 12 is set to a connecting construction 12d having a little freedom of turn within a flat surface at the middle portion. Accordingly, in the case of connecting the trailer TR to the dump truck DT, even when an angle of approach of the trailer TR is tilted at a little amount with respect to the dump truck DT, the holes of the pin receiving member 20 and the front end portion 12a of the of the trailing member 12 accurately coincide with each other due to an operation of the guide member 14 and the connecting construction 12d, so that a connecting operation for inserting the pin P into the hole can be easily performed.

Since a structure of the trailing portion in the dump truck side provided with the trumpet-shaped guide member 14 in the embodiment shown in FIG. 4 can be set to a structure shown in FIGS. 6 and 7, this point will be described. In FIGS. 6 and 7, the same reference numerals as those of the reference numerals in FIGS. 1 to 5 denote the same elements and the same portions.

In FIG. 6, an engaging ring 15a engaging with the hook 13 is provided on a back surface of the hook 13, and a trumpet-shaped connecting member 15 having a rear portion expanded in a trumpet shape is supported by three supporting springs 15b and attachably/detachably mounted. A vertical pin hole 15c is vertically extended through the trumpet-shaped connecting member 15. In this case, reference numeral 15d denotes a center hole for connecting the trailing member and reference numeral 15e denotes a trumpet-shaped expansion portion.

On the other hand, the trailing member 12 provided in the chassis 7 of the trailer TR so as to be freely risen and fallen by the oil hydraulic cylinder 12c via the shaft 12b is formed in a round rod shape at the front end side 12a and is formed so as to be loosely fitted to the center hole 15d of the trumpet-shaped connecting member 15. Further, the structure is made such that the pin hole 12d corresponding to the pin hole 15c is provided in the front end side 12a of the trailing member 15 and the pin P is inserted into both of the holes 15c and 12d so as to extend therethrough, whereby the trailing member 12 and the hook 13 can be connected via the trumpet-shaped connecting member 15.

In FIG. 6, reference numeral 16 denotes a manual winch for removing the pin P from the holes 15c and 12d, and a wire 16a is connected to the pin P via a pulley 16b. In this case, this winch 16 may be provided as occasion demands, and it must be always provided.

In the case that the connecting portion of the trailing mechanism is structured as exemplified in FIGS. 6 and 7, even when the axes of the front end side 12a of the trailing member 12 and the center hole 15d of the connecting member 15 are slightly tilted or slightly shifted, the trumpet-shaped connecting member 15 suspended to the spring 15b by a force acting on the trailing member 12 is displaced toward a direction opposing to the front end side 12a of the trailing member 12 in accordance that the front end portion 12a enters into the trumpet-shaped expansion portion 15e in the connecting member 15, so that it is always possible to realize a connection between the trailing member 12 and the trumpet-shaped connecting member 15.

Since the trailer TR mentioned above mounts a middle-sized internal combustion engine for a power engine 9 and restrictedly set a maximum speed, for example, to about 10 km/h suitable for a fixed platform working, the brake system and the electric system for the safety light and the like can be independently operated from the driver's seat 8 in the trailer TR itself. That is, the trailer TR is structured such as to be driven and self-propelled when it is not trailed. In this case, an illustration is omitted, however, it is possible to attach a winch for escaping from a bad road to the front portion of the trailer TR side.

On the other hand, the structure is made such that the brake system and the electric system for the safety light and the like in the dump truck side can be branched from the dump truck DT and detachably connected to the brake system and the electric system in the trailer side so that the brake of the brake system and the safety light of the electric system in the trailer interlock with the operation and the motion of those in the dump truck DT at a time of being trailed, that is, at a time of traveling on the general public road. An embodiment thereof will be shown in FIG. 8. In the embodiment in FIG. 8, the same brake system comprising a compressor 17, an air tank 18, a brake master cylinder 19, a brake pedal 20 and a brake 21 and the same electric system for a battery 22, a winker relay 23 interlocking with the brake pedal 20, a winker 24, a head light switch 25 and a safety light provided with a head light 26 are provided in both of the dump truck DT and the trailer TR. The brake system and the electric system in both of the vehicles are structured such that an exclusive circuit at a time of trailing shown by a wave line and a broken line in FIG. 8 is connected to the trailer TR side from the dump truck DT via couplers 27, 28 and 29, whereby these systems are operated in such a manner as to interlock with the operation in the dump truck DT side.

The dump truck according to the present invention structured as mentioned above travels on the general public road with trailing the trailer TR, however, in this case, the power engine, the brake system and the electric system in the trailed trailer TR side are set to an off state, the brake system and the electric system of the trailer TR are connected to the brake system and the electric system in the dump truck DT side, so that the brake system and the electric system of the trailer TR is operated in an interlocking manner. Accordingly, in this case, the trailer is used under a state of only serving a trailer trailed by the dump truck DT. Therefore, the brake system and the electric system in the dump truck DT side are branched and connected to those in the trailer TR side.

On the other hand, the trailer dump according to the present invention is structured such that when existing on a loading field or a taking-off field such as a working field and a fixed platform except the general public road, the brake system and the electric system are disconnected from those in the dump truck TD side, the power engine of the trailer TR is driven so as to remove the trailing member 12 from the hook 13, and an operator on the driver's seat 8 steers and drives the trailer TR on the working field and the fixed platform in the same manner as that of the general dump truck and performs a dumping operation of the load box 6.

Since the trailer dump according to the present invention is structured as mentioned above, that is, the trailer trailed by the dump truck is structured such as to be disconnected from the dump truck on the place such as the working field and the fixed platform except the general public road so that the trailer itself operates and functions in the same manner as that of the independent dump truck, there is an advantage that the loading and taking-off operations can be significantly rationally performed by giving the steered self-propelling function and the dumping function to the trailed trailer which the conventional simple trailed trailer does not have.

Further, when traveling on the general public road after moving forward from the loading and taking-off field, the operation is fully the same as that of the conventional trailed trailer, so that neither the fuel and the traveling fee are completely required, nor the operator is required. Accordingly, since a motor having a relatively small capacity is sufficient for the motor mounted on the trailer and the driver's seat can be formed in a simple type not provided with a cabin and the like, it is possible to produce at a significantly low cost in comparison with the producing cost for the general dump truck and in an easy manner.

Further, since one trailer dump according to the present invention can convey the load having an amount substantially the same as that conveyed by two dump trucks, at one conveying and traveling operation without being under an overload state, it is possible to obtain significant and characteristic effects which can not obtained in the conventional dump truck. The effects comprise (1) a rationality for the loading and taking-off operations, (2) an economical efficiency that the fuel, the traveling fee and the operator are not required for the trailer side at a time of trailing and traveling, (3) a protection of an environment due to the stop of the motor of the trailer at a time of trailing and traveling, (4) an improved conveying efficiency that one traveling operation can convey the load substantially corresponding to the amount of two dump trucks, and the like.

What is claimed is:

1. In a dump trailer unsuitable for driving over public roads, said dump trailer having an engine for providing motive power at an off-public-road dump site, a control station, a dump box, means for dumping contents of the dump box, and means for selectively connecting the dump trailer to a connection fixture on a towing vehicle so that the dump trailer may be towed to the dump site over public roads, and thereafter driven at the dump site to effect dumping of the contents of the dump box, the improvement wherein said connecting means comprises:

a towing bar pivotably connected at one end to the front of the dump trailer for both horizontal and vertical pivoting and being adapted at the other end for connection to a connection fixture of a towing vehicle by downward movement into a predetermined position with respect to the towing connection fixture, the horizontal pivoting of said towing bar facilitating towing of the dump trailer around curves in the public road and facilitating connecting the dump trailer to a towing vehicle at the dump site when the dump trailer and the towing vehicle are horizontally offset at the time of connection; and the vertical pivoting of said towing bar allowing upward movement of the bar to a first position non-interfering with the operation of the dump trailer at the dump site and downward movement of the bar to a second position effecting a connection to the towing vehicle even when the dump trailer and towing vehicle are not on level ground.

2. The dump trailer of claim 1, further including a truck suitable for travel on a public road, said truck having a connection fixture adapted for attachment to said towing bar.

3. In the combination truck suitable for travel on a public road and dump trailer of claim 2, a braking system wherein:

said truck suitable for travel on a public road and said dump trailer have independent brake control systems, the brake control system of said truck suitable for travel on a public road being interlocked with the brake control system of said dump trailer for controlling the operation of the brakes of said dump trailer when said dump trailer is being trailed by said truck suitable for travel on a public road; and the brake control system of said dump trailer independently controlling the brakes of said dump trailer when said dump trailer is detached from said truck suitable for travel on a public road.

* * * * *